(12) United States Patent
Nemala et al.

(10) Patent No.: US 12,142,288 B2
(45) Date of Patent: Nov. 12, 2024

(54) ACOUSTIC AWARE VOICE USER INTERFACE

(71) Applicant: Samsung Electronics Co., Ltd., Suwon-si (KR)

(72) Inventors: Sridhar Nemala, Santa Clara, CA (US); Dhruv Bharadwaj, Marathahallim (IN); Navjot Singh, Newark, CA (US); Sharon Gadonniex, Arlington, MA (US)

(73) Assignee: Samsung Electronics Co., Ltd., Suwon-si (KR)

(*) Notice: Subject to any disclaimer, the term of this patent is extended or adjusted under 35 U.S.C. 154(b) by 651 days.

(21) Appl. No.: 17/129,075

(22) Filed: Dec. 21, 2020

(65) Prior Publication Data

US 2021/0110838 A1    Apr. 15, 2021

Related U.S. Application Data

(63) Continuation of application No. PCT/US2019/038060, filed on Jun. 19, 2019.

(60) Provisional application No. 62/687,590, filed on Jun. 20, 2018.

(51) Int. Cl.
   *G10L 15/22*   (2006.01)
   *G10L 15/06*   (2013.01)
   *G10L 21/0216* (2013.01)

(52) U.S. Cl.
   CPC ........ *G10L 21/0216* (2013.01); *G10L 15/063* (2013.01); *G10L 15/22* (2013.01)

(58) Field of Classification Search
   USPC ............... 704/233, 246, 247, 251, 252, 275
   See application file for complete search history.

(56) References Cited

U.S. PATENT DOCUMENTS

| 8,315,857 | B2 | 11/2012 | Klein |
| 8,903,721 | B1 | 12/2014 | Cowan |
| 9,633,655 | B1 | 4/2017 | Santos |

(Continued)

FOREIGN PATENT DOCUMENTS

| EP | 3026667 | 6/2016 |
| JP | 5383867 | 1/2014 |

(Continued)

OTHER PUBLICATIONS

Krembel, International Search Report, International Application No. PCT/US2019/038060, European Patent Office, Rijswijk, NL, Sep. 9, 2019.

(Continued)

*Primary Examiner* — Leonard Saint-Cyr
(74) *Attorney, Agent, or Firm* — Jefferson IP Law, LLP

(57) ABSTRACT

A method for optimal configuration of a voice user interface is disclosed herein. The method includes receiving an audio signal; processing the audio signal by a context awareness module to generate context information regarding an acoustic environment of the audio signal; determining, based on the context information, an optimal one of a plurality of different configurations of a voice user interface to perform voice user interface processing of the audio signal; and performing the voice user interface processing of the audio signal using the optimal configuration of the plurality of different configurations.

19 Claims, 5 Drawing Sheets

(56) References Cited

U.S. PATENT DOCUMENTS

| | | | |
|---|---|---|---|
| 9,953,634 B1 | 4/2018 | Pearce | |
| 10,339,925 B1* | 7/2019 | Rastrow | H04M 3/42382 |
| 10,943,583 B1* | 3/2021 | Gandhe | G10L 15/183 |
| 11,081,104 B1* | 8/2021 | Su | G06F 40/216 |
| 2014/0278435 A1 | 9/2014 | Ganong, III | |
| 2016/0284349 A1* | 9/2016 | Ravindran | G10L 15/285 |
| 2018/0061409 A1* | 3/2018 | Valentine | G10L 15/20 |
| 2018/0069958 A1* | 3/2018 | Kang | H04M 3/002 |
| 2018/0144740 A1 | 5/2018 | Laroche | |
| 2019/0103100 A1* | 4/2019 | Rozen | G10L 15/30 |
| 2019/0206417 A1 | 7/2019 | Woodruff | |
| 2020/0117417 A1 | 4/2020 | Bowler, II | |
| 2020/0202843 A1 | 6/2020 | Shah | |
| 2021/0027789 A1* | 1/2021 | Grancharov | G10L 17/06 |
| 2021/0201928 A1 | 7/2021 | Rao | |
| 2021/0210109 A1 | 7/2021 | Weng | |

FOREIGN PATENT DOCUMENTS

| | | |
|---|---|---|
| WO | 2004057574 | 7/2004 |
| WO | 2016153712 | 9/2016 |
| WO | 2017127646 | 7/2017 |
| WO | 2020131681 | 6/2020 |

OTHER PUBLICATIONS

Weng, U.S. Appl. No. 17/335,663 U.S. Patent and Trademark Office, filed Jun. 1, 2021.
Unruh, U.S. Appl. No. 17/202,093 U.S. Patent and Trademark Office, filed Mar. 15, 2021.

* cited by examiner

ACOUSTIC AWARE VOICE USER INTERFACE

CROSS-REFERENCE TO RELATED APPLICATIONS

This application claims the benefit of and priority to International Application No. PCT/US2019/38060, filed Jun. 19, 2019 and U.S. Provisional Patent Application No. 62/687,590, filed Jun. 20, 2018, the entire contents of which are incorporated herein by reference.

TECHNICAL FIELD

This application relates generally to audio signal processing and more particularly to improving accuracy of voice user interface (VUI) in various acoustic environments and/or context.

BACKGROUND

Voice user interfaces (VUIs) allow human interaction with devices such as computers via a voice or speech recognition platform. For example, a mobile device can be operated in response to a voice command spoken by a user using a VUI of the mobile device. The successful application and widespread adoption of VUIs largely depends on the performance of the VUIs in a diverse set of practical environments and use cases of interest. However, voice recognition accuracy is typically low in challenging noise environments (e.g., an environment having a low signal-to-noise ratio).

BRIEF DESCRIPTION OF THE DRAWINGS

For a more complete understanding of the disclosure, reference should be made to the following detailed description and accompanying drawings wherein.

DETAILED DESCRIPTION

Figure 1:
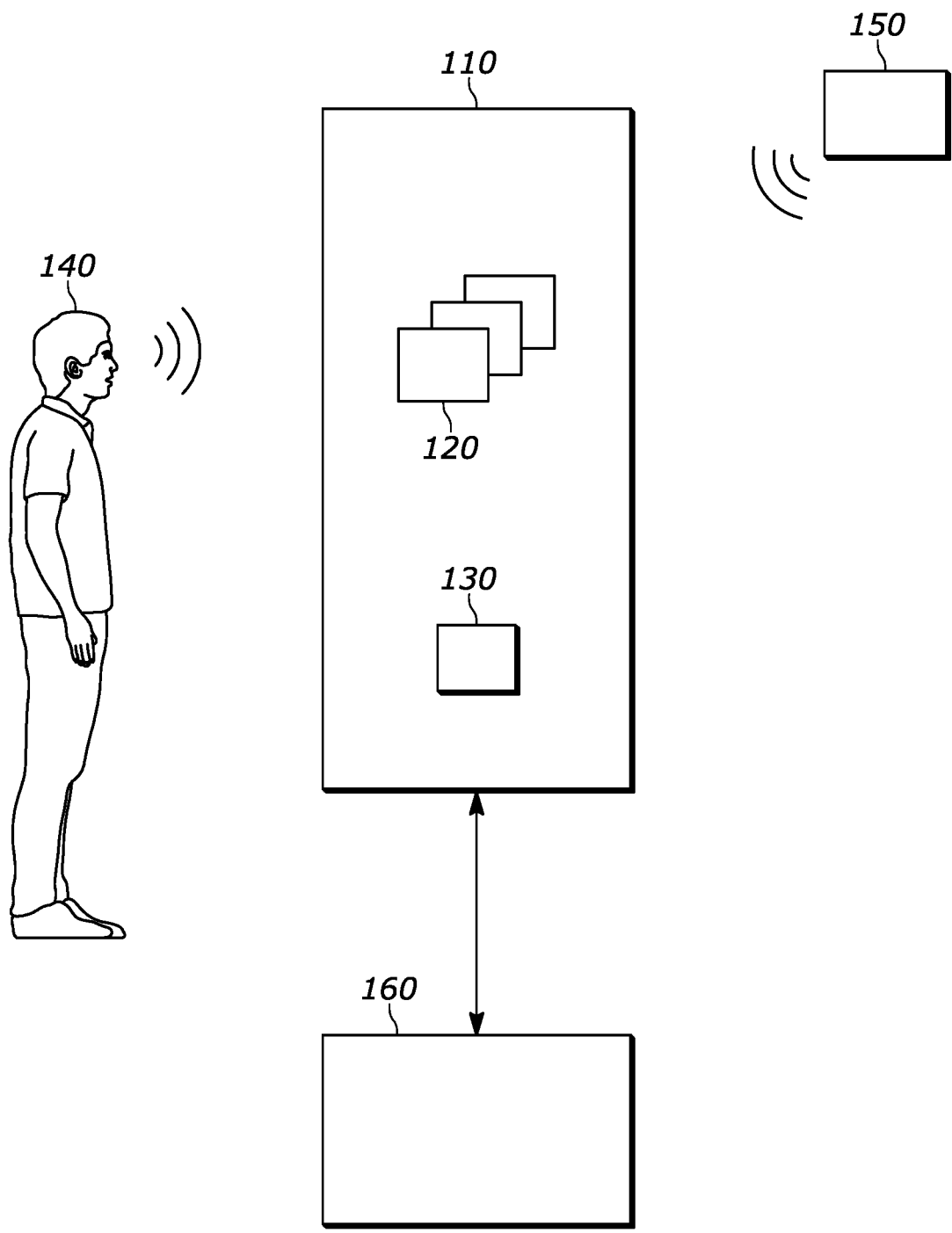
FIG. 1 is an example environment in which a method for voice user interface in a voice-controlled device can be practiced.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

According to certain general aspects, the present embodiments are directed to a way to substantially improve the accuracy of a VUI in challenging acoustic environments. In some embodiments, the VUI system can use a context awareness module (CAM) to adaptively adjust the behavior and/or application of VUI algorithms. For example, the CAM may provide information regarding the acoustic environment, such as signal-to-noise ratio (SNR) information, type of background noises (wind noise, home appliances, etc.), room acoustics (e.g., reverberation levels), location characteristics (e.g., car environment, indoors/outdoors), or device mode (e.g., device playing music), etc.

The VUI algorithms may utilize statistical models based on the input information provided by the CAM. A set of statistical models can be trained separately for each context of interest and the VUI can switch between each of the models based on CAM input for optimal performance. For example, a separate set of algorithms or statistical models that is optimized for performance in low SNR scenarios can be activated if a user of the VUI is located in a challenging noise environment.

Alternatively and/or additionally, VUI operation can be optimized for a specific performance metric of interest based on the CAM inputs. For example, there may be a need for optimizing VUI operation for a level of detection accuracy in very low-SNR conditions of high interest (e.g., voice trigger application in car use case), and where false wakes may not be a serious concern.

Alternatively and/or additionally, the CAM inputs can be used to activate or switch between lower and higher complexity stages of VUI algorithms that are performed on different computing resources or platforms. For example, low complexity VUI algorithms that achieve reasonably good performance in quiet conditions can run on a highly power-optimized smart microphone device (e.g. a microphone device incorporating a DSP (digital signal processor) or an ASIC (application-specific integrated circuit)). In contrast, challenging acoustic environments such as low SNRs may activate high power components such as Application Processor (AP) or even cloud computing platform for running high complexity VUI algorithms that can improve the VUI performance.

The VUI technology disclosed herein may be used in connection with voice-controlled devices. Various embodiments of the present disclosure can be practiced on mobile devices operable to receive and process an audio signal and configured to be controlled by a voice user interface. The mobile devices can include: radio frequency (RF) receivers, transmitters, and transceivers; wired and/or wireless telecommunications and/or networking devices; amplifiers; audio and/or video players; encoders; decoders; speakers; inputs; outputs; storage devices; and user input devices. The mobile devices may include input devices such as buttons, switches, keys, keyboards, trackballs, sliders, touchscreens, one or more microphones, gyroscopes, accelerometers, global positioning system (GPS) receivers, and the like. The mobile devices can include output devices, such as LED indicators, video displays, touchscreens, speakers, and the like. In some embodiments, the mobile devices can include hand-held devices, such as wired and/or wireless remote controls, notebook computers, tablet computers, phablets, smart phones, personal digital assistants, media players, mobile telephones, wearables, and the like.

In various embodiments, the mobile devices can be operated in stationary and portable environments. Stationary environments can include, for example, residential and commercial buildings or structures, and locations within such structures, such as living rooms, bedrooms, home theaters, conference rooms, auditoriums, and business premises. Portable environments can include moving vehicles, moving persons, and other transportation means.

Referring now to FIG. 1, an environment 100 is shown in which a method for optimizing voice user interface (VUI) performance can be practiced. The example environment 100 can include a mobile device 110 operable at least to receive an audio signal. The mobile device 110 may be further operable to process and/or record/store the received audio signal.

In some embodiments, the mobile device 110 includes at least an acoustic sensor, for example, one or more microphones 120. In various embodiments, the one or more microphones 120 are used to detect both an acoustic audio signal, for example, a verbal communication from a user 140, and a noise 150. The verbal communication can include keywords, commands, conversation, singing, and the like.

Noise 150 is unwanted sound present in the environment which can be detected by, for example, sensors such as microphones 120. In stationary environments, noise sources can include street noise, ambient noise, sounds from a mobile device such as audio, speech from entities other than an intended speaker(s), and the like. Portable environments can encounter certain kinds of noise which arise from their operation and the environments in which they operate, for example, road, track, tire/wheel, fan, wiper blade, engine, exhaust, entertainment system, communications system, competing speakers, wind, rain, waves, other vehicles, exterior, and the like. In some embodiments, the noise 150 can be analyzed by one or more processors of the mobile device 110 to determine context and/or surroundings, wherein the mobile device 110 is operated.

Acoustic signals detected by the microphone(s) 120 can be used to separate desired speech (for example, keywords and spoken commands) from the noise 150, providing more robust voice activation, automatic speech recognition (ASR), and the like. In various embodiments, the mobile device 110 is operable to perform one or more operations in response to received speech. One example of how mobile device 110 can be controlled using detected speech, which can be adapted for use in the present embodiments, is described in U.S. Pat. No. 9,633,655, the contents of which are incorporated by reference herein.

In various embodiments, the mobile device 110 may further include one or more sensors 130. In various embodiments, sensors 130 are used to determine parameters associated with the environment or surroundings in which the mobile device 110 is operated. For example, the sensors 130 can be used to determine whether the mobile device 110 is in motion or motionless. The sensors 130 are operable to variously detect proximity, motions, biometric data, and the like.

In some embodiments, the mobile device 110 can be connected to a cloud-based computing resource 160 (also referred to as a computing cloud). In some embodiments, the computing cloud 160 includes one or more server farms/clusters comprising a collection of computer servers and is co-located with network switches and/or routers. The computing cloud 160 is operable to deliver one or more services over a network (e.g., the Internet, mobile phone (cell phone) network, and the like). In certain embodiments, at least partial processing of an audio signal can be performed remotely on the computing cloud 160. The mobile device 110 is operable to send data such as, for example, a recorded acoustic signal, to the computing cloud 160, request computing services, and receive back the result of the computation.

Figure 2:
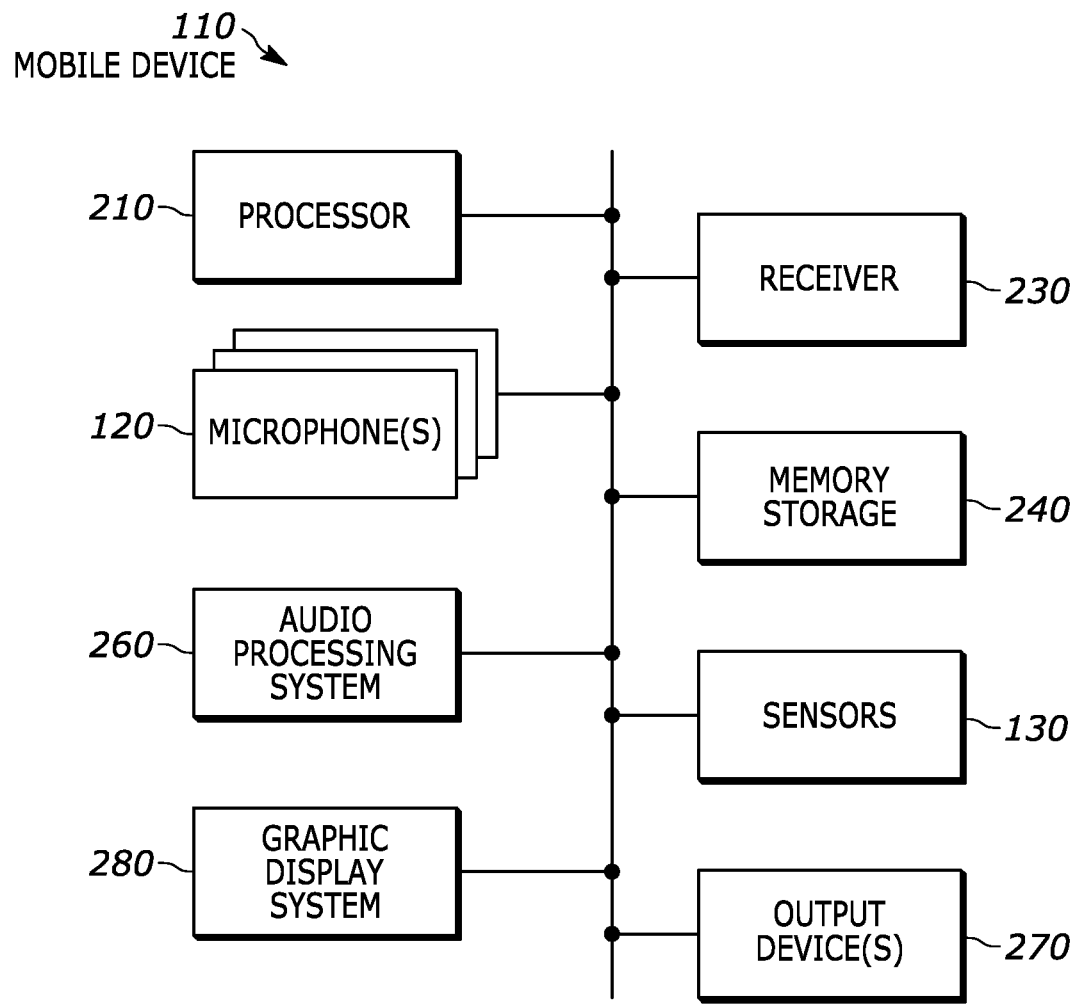
FIG. 2 is a block diagram of a voice-controlled device including a voice user interface, according to an example embodiment.

FIG. 2 is a block diagram showing components of mobile device 110, according to an example embodiment. FIG. 2 provides further details for the mobile device 110 of FIG. 1. In the illustrated embodiment, the mobile device 110 includes, e.g., a processor 210, one or more microphones 120, a transceiver 230, memory storage 240, an audio processing system 260, output device(s) 270, a graphic display system 280, and one or more sensors 130. In other embodiments, the mobile device 110 includes additional or other components necessary for operations of mobile device 110. In certain other embodiments, the mobile device 110 includes fewer components that perform functions similar or equivalent to those depicted in FIG. 2.

In various embodiments, processor 210 includes hardware and/or software, which is operable to execute instructions stored in a memory storage 240. The processor 210 may use floating point operations, complex operations, and other operations, to perform various functions. For example and without limitation, processor 210 and instructions in memory storage 240 can partially or fully implement a CAM and a VUI according to the present embodiments to be described in more detail below, which can operate based on signals from one or more of microphones 120 (as first perhaps processed by audio processing system 260) and sensors 130. In these and other embodiments, processor 210 may further be configured to control operation of the mobile device based on processing performed by the CAM and VUI. Processor 210 may also perform other functions for the mobile device 110 which are not necessarily related to the functions of the present embodiments.

In various embodiments, the transceiver 230 can be configured to communicate with a network such as the Internet, Wide Area Network (WAN), Local Area Network (LAN), cellular network, and so forth, to receive an audio data stream. The received audio data stream may then be forwarded to the audio processing system 260 and the output device 270. Transceiver 230 can also be configured to communicate with one or more networks to send data, for example a recorded audio data stream, to computing cloud 160 or other external computing resource.

In various embodiments, the sensors 130 include one or more of the following: an accelerometer, a magnetometer, a gyroscope, an Inertial Measurement Unit (IMU), a temperature sensor, an altitude sensor, a proximity sensor, a barometer, a humidity sensor, a color sensor, a light sensor, a pressure sensor, a Global Positioning System (GPS) module, an ultrasound sensor, an infrared sensor, a touch sensor, and so forth. In some embodiments, the sensors 130 of the mobile device 110 include photo and video camera(s). In further embodiments, the sensors 130 include a bio sensor, photoplethysmogram (PPG), a Galvanic skin response (GSR) sensor, an ion gas analyzer, an electroencephalogram (EEG), and an electrocardiogram (EKG). In still further embodiments, sensors 130 include sensors that provide information about the operational status of the device 110, including operational/connection status of WiFi or Bluetooth, battery power supply or charging, device 110 audio output status (e.g. music player), etc.

The audio processing system 260 can be configured to receive acoustic signals from an acoustic source via one or more of microphones 120 and process the acoustic signals. The microphones 120 may be spaced a distance apart such that the acoustic waves impinging on the device from certain directions exhibit different energy levels at the two or more microphones. After receipt by the microphones 120, the acoustic signals can be converted into electric signals. These electric signals can, in turn, be converted by an analog-to-digital converter (not shown) into digital signals for processing by audio processing system 260 in accordance with some embodiments.

For example, and without limitation, in various embodiments, where the microphones 120 may be omni-directional microphones that are closely spaced (e.g., 1-2 cm apart), a beamforming technique can be used to simulate a forward-facing and backward-facing directional microphone response. A level difference can be obtained using the simulated forward-facing and backward-facing directional microphone. The level difference can be used by the audio processing system to discriminate speech and noise in, for example, the time-frequency domain, which can be used in noise and/or echo reduction. In some embodiments, some microphones are used mainly to detect speech and other microphones are used mainly to detect noise. In various embodiments, at least one or more of the microphones can be used to detect both noise and speech.

In some embodiments, the output device 270 includes any device providing an audio output to a user (e.g., the acoustic source). For example, the output device 270 may comprise a speaker, a class-D output, an earpiece of a headset, or a handset of the mobile device 110.

In various embodiments, the graphic display system 280 is operable to provide a user graphic interface. In some embodiments, a touchscreen associated with the graphic display system 280 can be utilized to receive input from a user. The options can be provided to the user via an icon or text buttons once the user touches the screen.

It should be noted that, although shown separately in FIG. 2 for ease of illustration, certain of the components of mobile device 110 can be combined and/or integrated together in various ways in various embodiments. For example, where one or more of microphones 120 is a "smart" microphone (i.e., a microphone module including one or more processors such as an ASIC or a DSP and associated firmware), certain of the functionality performed by processor 210 and/or audio processing system 260 can be actually be performed by such a "smart" microphone. As another example, mobile device 110 can include an application processor (AP) that can perform certain or all of the functionality performed by processor 210 and/or audio processing system 260, perhaps in addition to other functionality.

Figure 3:
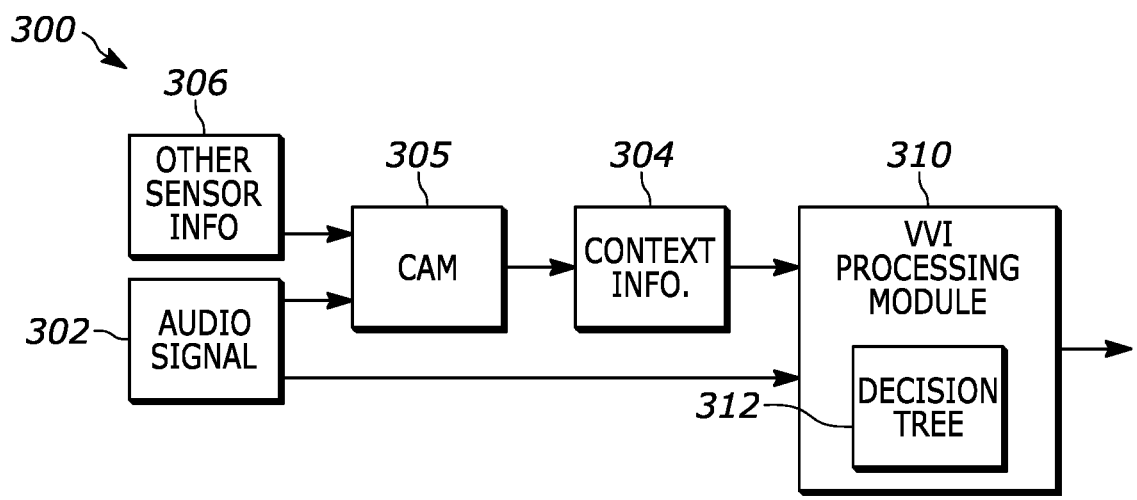
FIG. 3 is a block diagram showing a voice user interface system for a voice-controlled device, according to an example embodiment.

FIG. 3 is a block diagram showing an acoustic aware voice user interface system 300 that can be implemented by a device 110 (e.g. using processor 210 and/or a smart microphone), according to an example embodiment. The voice user interface system 300 may include a context awareness module (CAM) 305. The CAM 305 continuously operates to process an input audio signal 302 and to provide context information 304 regarding the acoustic environment, such as signal-to-noise ratio (SNR) information, type of background noises (wind noise, home appliances, etc.), room acoustics (e.g., reverberation levels) or location characteristics (e.g., car environment, indoors/outdoors)

Information regarding the acoustic environment can be obtained in various ways for various types of information. For example, different types of background noises can be determined using statistical models that have been specifically trained to detect a specific type of background noise. Such statistical models can include Gaussian mixture models, Markov models, neural networks and the like. Training of such models can include extracting features from a large database of audio data that is known to include a specific type of background noise (e.g. wind noise, home appliance noise, etc.). The signal features can be extracted from the audio signal in various ways known to those skilled in the art, depending upon the type of signal feature that is extracted. For example, where the audio signal comprises sounds captured by several different microphones, the signal features can include phase differences between sound signals captured by the different microphones, magnitude differences between sound signals captured by the different microphones, respective microphone energies, etc. For individual sound signals from a given microphone, the signal features may include magnitude across a particular spectrum, modulations across a spectrum, frames of magnitude spectra, etc. In these and other embodiments, the signal features may include information representing relationships or correlations between audio signals from different microphones such as inter-microphone coherence. A model coefficient update process can then be performed using the extracted features until the model is optimized to make a prediction consistent with the known type of background noise. Those skilled in the art will understand how to apply various known techniques for use in determining acoustic context according to the present embodiments.

In some embodiments, in addition to the input audio signal 302, the CAM 305 may include other sensor information 306 as input (e.g. from sensors 130). For example, the CAM 305 may use motion sensor information 306 to determine whether or not the device is moving, or whether the user is active (e.g., playing sports). The CAM 305 may also collect information regarding the status of the device, such as whether the device is being charged or powered by a battery, or whether the device is connected with other devices (e.g., through Bluetooth).

Using one or both of audio signal 302 and information 306, CAM 305 produces context information 304. Information 304 can be provided in different formats for different embodiments of VUI processing module 310. For example, information 304 can include simple one-bit indications of acoustic or context information, such as whether or not there is wind noise in the audio signal, or whether or not the device is moving. Information 304 can additionally or alternatively include several bits of information regarding acoustic or other context, such as different predetermined SNR noise levels. It should be apparent that there can be many possible combinations and variations of these and other types of information.

In these and other examples, VUI processing module 310 can adjust its VUI processing of audio signal 302 in a pre-configured way based on the finite number of expected values in information 304. As shown in the example of FIG. 3, VUI processing module 310 includes decision tree 312 that includes logic for deciding how to configure processing of audio signal 302 based on the various possible combinations of values of information 304. For example, decision tree 312 can specify one configuration of processing based on whether there is wind noise, and another different configuration based on whether there is wind noise combined with fast motion, such as a moving car. The decision tree 312 can be pre-programmed into VUI processing module 310 in an offline process, for example.

In other embodiments, VUI processing module 310 can include functionality for processing of the context information 304 to dynamically determine an optimal way to process audio signal 302 based on the particular acoustic or other context indicated by the context information 304.

VUI processing module 310 may include one or more of a voice activity detector, a voice trigger, a keyword detector, a voice user authentication function, and an automatic speech recognition (ASR) function. According to various embodiments, the voice detector or trigger is operable to receive audio signal and analyze the received audio signal to determine whether the audio signal contains voice. The keyword detector is operable to recognize one or more keyword in the received audio signal. The keyword can be selected by a user or preprogrammed into mobile device 110. In response to the recognition of the keyword, the mobile device can enter the authentication mode. The voice user authentication function is operable to authenticate a user based on the received spoken keyword. In some embodiments, the authentication includes determining that a particular pre-determined word was pronounced. In further embodiments, the authentication includes matching the spoken word to a word previously recorded by a particular user. The ASR function is operable to translate spoken words in the received audio signal into text or other language representation (for example, phonemes). The spoken words can include commands to control the mobile device 110.

Figure 4A:
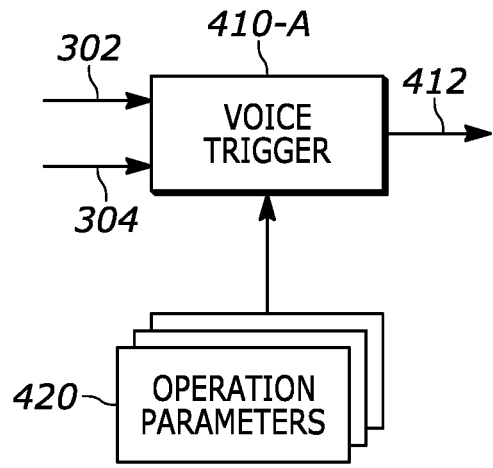
FIG. 4A is a block diagram showing one possible configuration of a voice user interface having a voice trigger, according to an example embodiment.

For example, as shown in FIG. 4A, the VUI processing module 310 may comprise a voice activity detector or voice trigger 410-A. Voice trigger 410-A may operate to detect voice in audio signal 302 according to operation parameters 420, such as various values of a detection threshold. The output 412 of the voice trigger 410-A can be used to trigger a voice recognition process and/or wake up or activate components of mobile device 110 (e.g. turn on a display) if the level of speech in audio signal 302 reaches the detection threshold. Based on the context information 304 (e.g., SNR information), the voice trigger 410-A may select predetermined ones of the operation parameters 420.

For example, the context information 304 may provide one of ten different SNR levels, and there may be ten different detection thresholds in operation parameters 420, each threshold value being determined in an offline process to be optimal for a respective one of the ten different SNR levels (e.g. the detection threshold value that yields the lowest false acceptance rate for the given SNR level). Based on the SNR level indicated by the context information 304, and the pre-configuration of decision tree 312, voice trigger 410-A may perform processing on the audio signal 302 using the corresponding detection threshold in operation parameters 420. One example of how false acceptance rate can be reduced according to SNR level that can be adapted for use in the present embodiments is provided in U.S. Patent Publ. No. 2018/0061396, the contents of which are incorporated by reference herein. It should be noted, however, that many other types and combinations of different operation parameters are possible in addition to detection thresholds (e.g. confidence levels, etc.), including different operating parameters for different types of VUI processing.

Figure 4B:
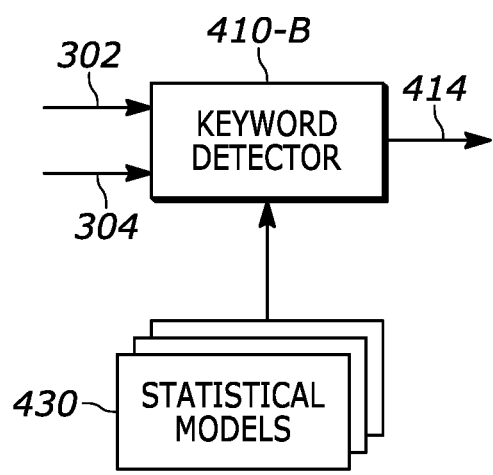
FIG. 4B is a block diagram showing one possible configuration of a voice user interface having a keyword detector, according to an example embodiment.

Alternatively or additionally, as shown in FIG. 4B, VUI processing module 310 may comprise a keyword detector 410-B. Keyword detector 410-B may operate to detect a keyword in an audio signal using statistical models 430. The output 414 of the keyword detector 410-B can be used to cause a certain operation to be performed if the keyword is detected in the audio signal 302 by keyword detector 410-B. Based on the context information 304 (e.g., type of noise environment, whether there is wind noise, whether the device is indoors or outdoors, etc.), the keyword detector 410-B may select predetermined ones of the statistic models 430. For example, there may be one statistical model 430 that is especially trained for detecting the keyword in the presence of wind noise, and another statistical model 430 that is especially trained for detecting the keyword when the device is indoors. Based on the particular acoustic environment indicated by the context information 304 (e.g., presence of wind noise or the device being indoors), keyword detector 410-B may perform keyword detection processing on the audio signal 302 using the corresponding statistical model 430.

Figure 4C:
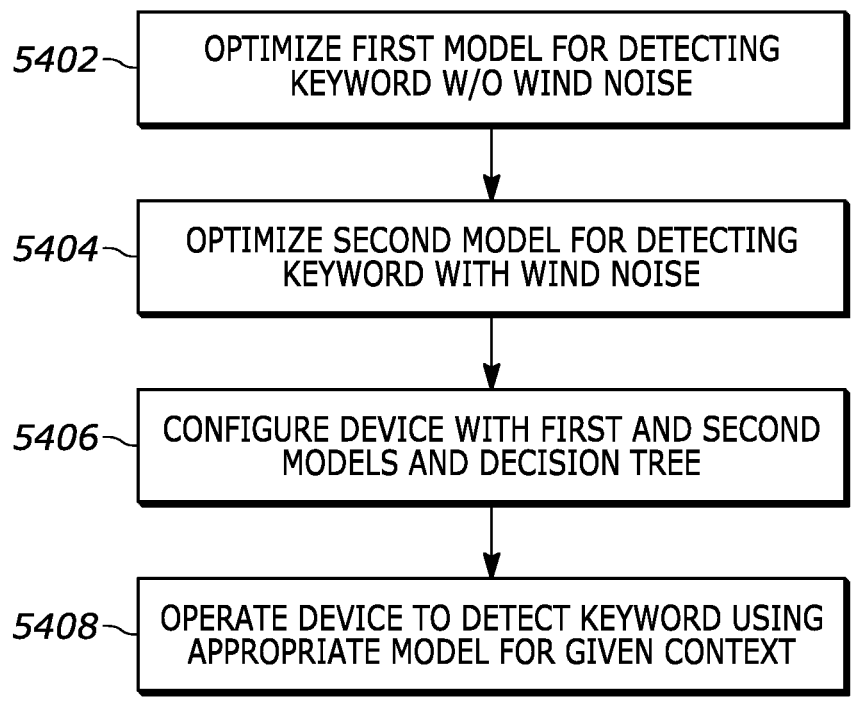
FIG. 4C is a flowchart illustrating aspects of configuring a keyword detector such as that shown in FIG. 4B, according to an example embodiment.

A flowchart illustrating one example methodology according to these and other embodiments of VUI processing module 310 is shown in FIG. 4C. As shown in FIG. 4C, in step 5402, a first model (e.g., a Gaussian mixture model) for detecting a keyword is optimized for a context that does not include wind noise. This optimization can include performing model training using a database of audio signals that are known to include the keyword and no substantial wind noise, and using the training techniques such as those described above in connection with model training for detecting different background noises. In a next step 5404, a second model for detecting the keyword is optimized for a context that does include wind noise. This optimization can include performing model training using a database of audio signals that are known to include the keyword and wind noise exceeding a specified threshold. After the first and second models have been prepared in steps 5402 and 5404, in step 5406 a device including VUI processing module 310 (e.g. keyword detector 410-B) is configured with the models, and its decision tree 312 is programmed to select the appropriate model for use in detecting the keyword based on the wind noise level provided in context information 304. It should be noted that the optimizations in steps 5402 and 5404 can be performed in an offline process and the configuration in step 5406 can be performed when VUI processing module 310 is first initialized or updated. However, online processing to perform model optimizations are also possible. In any event, in step 5408, during operation of the device, when a keyword detector 410-B is being used, the keyword detector 410-B will use the first or second model depending on the presence of wind noise as provided in context information 304.

Figure 4D:
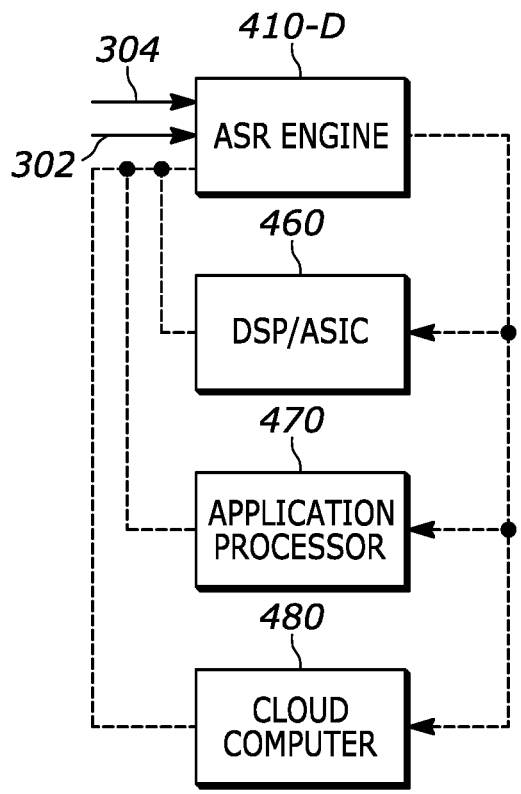
FIG. 4D is a block diagram showing one possible configuration of a voice user interface having an ASR engine, according to an example embodiment.

Turning to FIG. 4D, the VUI processing module 310 in a still further example may comprise an ASR engine 410-D that is configured to recognize speech in audio signal 302. Such an ASR engine 410-D may be further configured (e.g. by programming decision tree 312 accordingly) to call for appropriate computing resources or algorithms to be used, based on context information 304. For example, if the context information 304 suggests a challenging acoustic environment (e.g., low SNR below a certain threshold), the ASR engine 410-D may send the audio signal to a more advanced computing resource for the voice recognition task. As shown in this example, ASR engine 410-D is configured to select one of three different computing resources for performing voice recognition on the audio signal 302, a DSP/ASIC 460, an application processor 470 or a cloud computer 480, based on the context information 304. In these and other embodiments, ASR engine 410-D can be further configured to provide information regarding failed attempts to perform voice recognition on the audio signal 302 to the other computing resources.

For example, if based on the context information 304, the ASR engine 410-D determines (e.g., using decision tree 312) that low complexity VUI algorithms can achieve reasonably good performance in the quiet conditions, the ASR engine 410-D may assign the voice recognition task to the highly power-efficient DSP 460 (e.g., a DSP in an edge device such as a smart microphone). In contrast, if based on the context information 304, the ASR engine 410-D determines that acoustic environments are challenging such as low SNRs, the ASR engine 410-D may assign the voice recognition task to high power components such as AP 470 or even cloud computing platform 480 (e.g., assuming there is a network connection) for running high complexity VUI algorithms that can improve the VUI performance.

Figure 5:
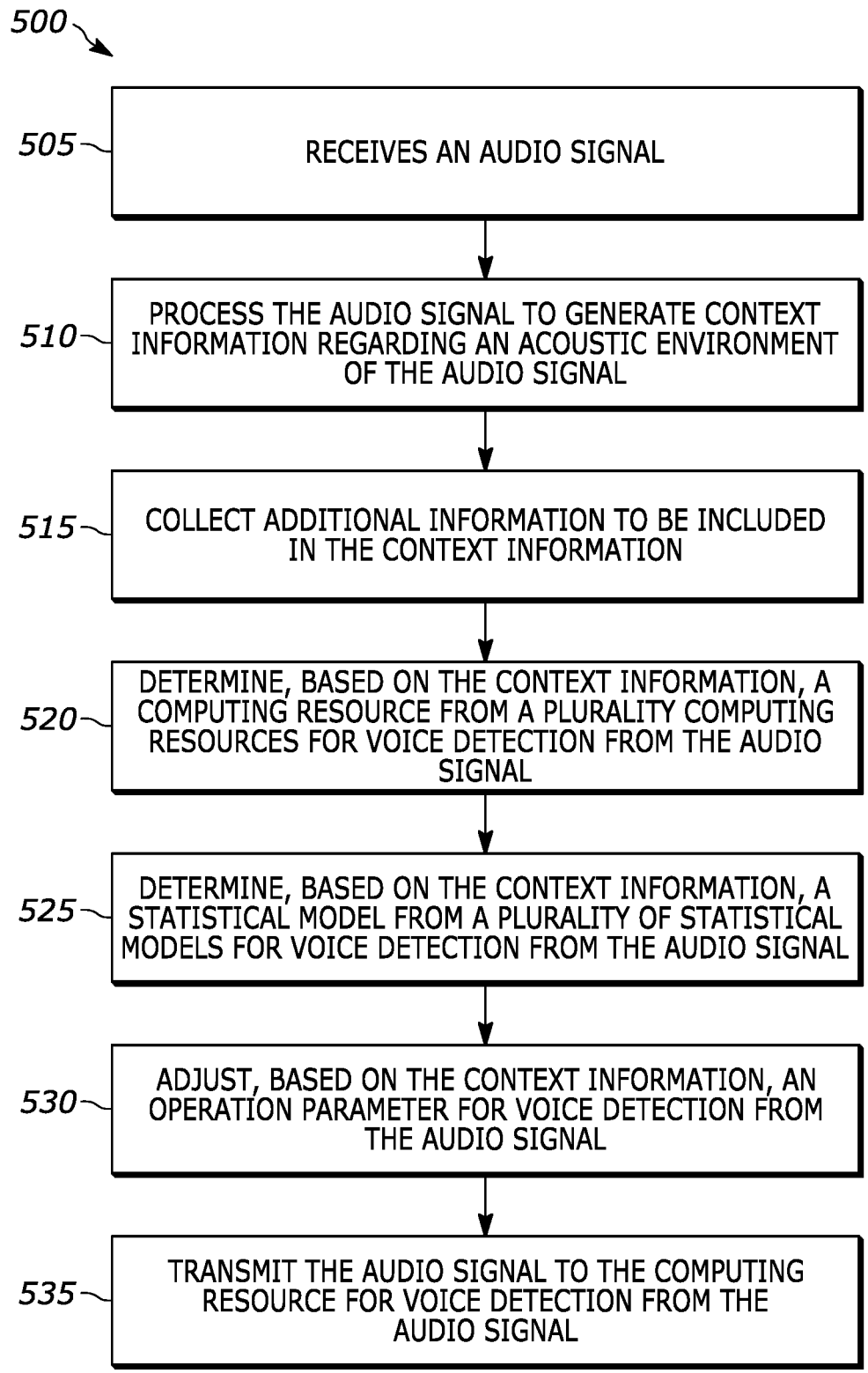
FIG. 5 is a flow chart showing a method for voice user interface in a voice-controlled device, according to an example embodiment.

FIG. 5 illustrates a flow chart of an example method for a voice user interface according to the present embodiments. At step 505, the system receives an audio signal. At step 510, a context awareness module of the system processes the audio signal to generate context information regarding an acoustic environment of the audio signal. The context information may include, e.g., signal-to-noise ratio (SNR) information, type of background noises, room acoustics, room characteristics, or background sound type.

At step 515, the context awareness module collects additional information to be included in the context information. The additional information may include, e.g., additional sensor information or a device status. For example, the information regarding the acoustic environment can indicate whether there is wind noise, and the additional sensor information can include that the device is moving, which combined with the acoustic information can indicate that the device is in a moving car.

At step 520, the system may determine, based on the context information, a computing resource from a plurality of computing resources for voice detection from the audio signal. The plurality of computing resources may include, e.g., a digital signal processor (DSP), an application-specific integrated circuit (ASIC), an Application Processor (AP), or a cloud computing platform.

At step 525, the system may further or alternatively determine, based on the context information, a statistical model from a plurality of statistical models for voice detection from the audio signal. Each model of the plurality of statistical models is trained for a different acoustic environment.

At step 530, the system may further or alternatively adjust, based on the context information, an operation parameter for voice detection from the audio signal. The operation parameter can include a detection threshold.

At step 535, the system may transmit the audio signal to an appropriate computing resource for voice user interface processing from the audio signal. The system may further transmit information regarding previous failed attempts along with the audio signal. For example, the system can be configured to perform speech recognition on the audio signal using a low-power DSP, and to cause the DSP to return a set of possible recognized words in the audio signal having the highest unsuccessful detection thresholds. The system can then forward this set of possible recognized words along with the audio signal to a higher powered computing resource.

As used herein, the singular terms "a," "an," and "the" may include plural references unless the context clearly dictates otherwise. Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A method comprising:
generating, based on an audio signal captured by one or more microphones, context information regarding an acoustic environment of the audio signal;
determining, based on the context information, a first configuration among a plurality of different configurations to perform processing of the audio signal for a voice user interface, and an acoustic environment characteristic, wherein the plurality of different configurations include a plurality of different statistical models for the processing of the audio signal; and
switching between the different statistical models to activate an acoustic environment statistical model as the first configuration, where the activated acoustic environment statistical model is trained for the determined acoustic environment characteristic,
wherein the processing of the audio signal is performed for the voice user interface using the first configuration, and
wherein the plurality of different statistical models include a plurality of different acoustic environment statistical models.

2. The method of claim 1,
wherein each of the plurality of different configurations includes a computing resource among a plurality of different computing resources to perform the processing of the audio signal, and
wherein the plurality of different computing resources include at least two of a digital signal processor (DSP), an application-specific integrated circuit (ASIC), an application processor (AP), or a cloud computing platform.

3. The method of claim 1, wherein the context information includes at least one of signal-to-noise ratio (SNR) information, background sound type, room acoustics, room characteristics, location characteristics, or device operational status.

4. The method of claim 1, wherein the plurality of different configurations is a plurality of different operation parameters for the processing of the audio signal.

5. The method of claim 4, wherein the plurality of different operation parameters include voice activity detection threshold values.

6. The method of claim 1, further comprising:
collecting additional information to be included in the context information.

7. The method of claim 6, wherein the additional information includes information from at least one of an inertial sensor, a temperature sensor, a proximity sensor, a device operational status sensor, and a global positioning system (GPS) module.

8. The method of claim 1, wherein the processing of the audio signal includes at least one of voice activity detection, keyword detection, voice user authentication, or automatic speech recognition.

9. The method of claim 1, wherein at least one statistical model of the plurality of different statistical models is trained for an acoustic environment by performing a model coefficient update process using extracted audio signal features to optimize the at least one statistical model to make a prediction consistent with a known type of background noise.

10. The method of claim 1, wherein at least one statistical model of the plurality of different statistical models is a Gaussian mixture model that is optimized for a particular acoustic environment based on model training using a database of:
first audio signals that are known to include a keyword in a presence of a particular background noise being at or below a threshold to establish that the particular background noise is not significantly part of the particular acoustic environment, and
second audio signals that are known to include the keyword in the presence of the particular background noise exceeding the threshold to establish that the particular background noise is significantly part of the particular acoustic environment.

11. A device comprising:
memory storage storing instructions; and
one or more processors,
wherein the instructions, when executed by the one or more processors, cause the device to:
generate, based on an audio signal captured by one or more microphones, context information regarding an acoustic environment of the audio signal,
determine, based on the context information, a first configuration among a plurality of different configurations to perform processing of the audio signal for a voice user interface, and an acoustic environment characteristic, wherein the plurality of different configurations include a plurality of different statistical models for the processing of the audio signal, and
switch between the different statistical models to activate an acoustic environment statistical model as the first configuration, where the activated acoustic environment statistical model is trained for the determined acoustic environment characteristic,
wherein the processing of the audio signal is performed for the voice user interface using the first configuration, and
wherein the plurality of different statistical models include a plurality of different acoustic environment statistical models.

12. The device of claim 11,
wherein each of the plurality of different configurations includes a computing resource among a plurality of different computing resources to perform the processing of the audio signal, and
wherein the device further comprises:
a signal interface configured to transmit the audio signal to the computing resource included in the first configuration.

13. The device of claim 12,
wherein the one or more processors include at least one of a digital signal processor (DSP), an application-specific integrated circuit (ASIC), or an application processor (AP), and
wherein the plurality of different computing resources include at least two of the digital signal processor (DSP), the application-specific integrated circuit (ASIC), the application processor (AP), or a cloud computing platform.

14. The device of claim 13, wherein the cloud computing platform is remotely connected with the device via a network.

15. The device of claim 11, wherein the context information includes at least one of signal-to-noise ratio (SNR) information, background sound type, room acoustics, room characteristics, location characteristics, or device operational status.

16. The device of claim 11, wherein the plurality of different configurations is a plurality of different operation parameters for the processing of the audio signal.

17. The device of claim 16, wherein the plurality of different operation parameters include voice activity detection threshold values.

18. The device of claim 11,
wherein the memory storage further includes instructions that, when executed by the one or more processors, cause the device to:
collect additional information to be included in the context information, and
wherein the additional information includes information from at least one of an inertial sensor, a temperature sensor, a proximity sensor, a device operational status sensor, or a global positioning system (GPS) module.

19. The device of claim 11, wherein the processing of the audio signal includes at least one of voice activity detection, keyword detection, voice user authentication, or automatic speech recognition.

* * * * *